United States Patent
Emorine et al.

(10) Patent No.: US 11,173,752 B2
(45) Date of Patent: *Nov. 16, 2021

(54) TIRE COMPRISING HIGH-CONTRAST MARKING

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Helene Emorine, Clermont-ferrand (FR); Olivier Muhlhoff, Clermont-ferrand (FR); Mathieu Vandaele, Clermont-ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Grange-Paccot (CH)

( * ) Notice: Subject to any disclaimer, the term of this patent is extended or adjusted under 35 U.S.C. 154(b) by 838 days.

This patent is subject to a terminal disclaimer.

(21) Appl. No.: 14/899,683

(22) PCT Filed: Jun. 19, 2014

(86) PCT No.: PCT/EP2014/062959
§ 371 (c)(1),
(2) Date: Dec. 18, 2015

(87) PCT Pub. No.: WO2014/202731
PCT Pub. Date: Dec. 24, 2014

(65) Prior Publication Data
US 2016/0137008 A1    May 19, 2016

(30) Foreign Application Priority Data
Jun. 21, 2013  (FR) .................................. 1355937

(51) Int. Cl.
*B60C 13/02* (2006.01)
*B60C 13/00* (2006.01)

(52) U.S. Cl.
CPC ............ *B60C 13/02* (2013.01); *B60C 13/001* (2013.01)

(58) Field of Classification Search
CPC ........ B60C 13/001; B60C 13/02; B60C 13/04
(Continued)

(56) References Cited

U.S. PATENT DOCUMENTS 1,567,402 A * 12/1925 Venn .......................... 152/523 X
3,518,335 A *  6/1970 Jablonski .................. 152/523 X
(Continued)

FOREIGN PATENT DOCUMENTS

EP    0 253 557 A2 *  1/1988
EP    2204296 A2      7/2010
(Continued)

OTHER PUBLICATIONS

English machine translation of JP 2006-224704 A, Aug. 31, 2006.*
(Continued)

*Primary Examiner* — Adrienne C. Johnstone
(74) *Attorney, Agent, or Firm* — Dickinson Wright PLLC; Steven Hurles

(57) ABSTRACT

A tire made of rubber material includes a sidewall and a marking protruding from this sidewall. The tire has a texture, which has a plurality of strands protruding from the sidewall, these strands being distributed at a density at least equal to five strands per square millimeter ($mm^2$), each strand having a mean cross section between 0.0007 $mm^2$ and 0.06 $mm^2$ and/or the texture having a plurality of substantially mutually parallel lamellae protruding from the sidewall, the spacing of the lamellae being less than or equal to 0.5 mm, each lamella having a mean width between 0.03

(Continued)

mm and 0.3 mm. The texture protrudes from the sidewall of the tire, and this texture surrounds all or part of the marking.

8 Claims, 5 Drawing Sheets

(58) Field of Classification Search
USPC .................. 152/523, 524; 40/587, 596, 616; D12/605
See application file for complete search history.

(56) References Cited

U.S. PATENT DOCUMENTS

| | | | | |
|---|---|---|---|---|
| 4,198,774 A | * | 4/1980 | Roberts | B60C 13/001 152/523 |
| 4,444,713 A | * | 4/1984 | Egan | B60C 13/001 152/523 |
| 4,823,856 A | * | 4/1989 | Roberts | B60C 13/001 152/523 |
| 5,728,242 A | * | 3/1998 | Barrese | B60C 13/001 152/523 |
| 6,053,228 A | * | 4/2000 | Baker | B60C 13/001 152/523 |
| 8,672,008 B2 | * | 3/2014 | Muhlhoff | B60C 13/001 152/523 |
| 8,875,763 B2 | * | 11/2014 | Paturle | B60C 13/001 152/523 X |
| 2008/0283169 A1 | * | 11/2008 | Sato | B60C 13/001 |
| 2009/0218019 A1 | | 9/2009 | Paturle | |
| 2010/0051159 A1 | * | 3/2010 | Fujioka | B60C 13/001 152/523 |
| 2012/0055603 A1 | * | 3/2012 | Tokizaki | B60C 13/001 152/523 |
| 2012/0227879 A1 | | 9/2012 | Muhlhoff et al. | |
| 2013/0299056 A1 | * | 11/2013 | Iwabuchi | B60C 13/001 152/523 |

FOREIGN PATENT DOCUMENTS

| | | | |
|---|---|---|---|
| FR | 2950552 A1 | | 4/2011 |
| JP | 08282216 A | * | 10/1996 |
| JP | 2004224342 A | * | 8/2004 |
| JP | 2006224704 A | * | 8/2006 |
| JP | 2008137613 A | * | 6/2008 |
| JP | 2012183869 A | * | 9/2012 |
| WO | WO-00/13922 A1 | * | 3/2000 |
| WO | WO-2012/032741 A1 | * | 3/2012 |

OTHER PUBLICATIONS

English machine translation of JP 2012-183869 A, Sep. 27, 2012.*
International Search Report for Priority Application PCT/EP2014/062959 dated Sep. 12, 2014.

* cited by examiner

TIRE COMPRISING HIGH-CONTRAST MARKING

This application is a 371 national phase entry of PCT/EP2014/062959, filed 19 Jun. 2014, which claims benefit of French Patent Application No. 1355937, filed 21 Jun. 2013.

BACKGROUND

The present disclosure relates to a tire for a motor vehicle comprising a marking and a special texture surrounding this marking.

DESCRIPTION OF RELATED ART

Tire sidewalls have a great many markings intended to provide technical and legal information or to allow consumers to discern the origin of the product.

Attempts are constantly being made at improving the visibility and legibility of these markings on tire sidewalls.

Document EP2204296 describes a texture present on the external surface of a tire sidewall. This texture comprises a plurality of strands universally distributed in this texture.

Document US 2008/0283169 describes a tire made of rubber material comprising a sidewall and a marking formed on this sidewall. The marking is positioned in a housing recessed into the sidewall. This marking protrudes from the bottom of the housing so that it enjoys good visibility on the tire sidewall.

However, during running, large amounts of mud or dust may become lodged in the housing, thereby reducing the contrast between the marking and the bottom of the housing. Moreover, the manufacture of such a marking lodged in a housing requires an additional operation of machining the mould, and this operation can be long and expensive.

There is therefore a need to propose a solution that allows high-contrast marking to be preserved on the sidewall of a tire, and that is simple and economical to implement.

DEFINITIONS

A "tire" means any type of resilient tire whether or not subjected to an internal pressure.

The "tread" of a tire means a quantity of rubber material delimited by lateral surfaces and by two main surfaces, one of which is intended to come into contact with a roadway when the tire is running.

The "sidewall" of a tire means a lateral surface of the tire positioned between the tire tread and a bead of this tire.

A "marking" on a tire sidewall means indications on this sidewall intended to provide technical and legal information or to allow consumers to discern the origin of the product.

A "texture" means an organized arrangement of a plurality of elements, all or part of the elements of the arrangement being repeats of one single basic element, for example a strand or a lamella.

A "strand" means a filiform element of which the height is at least equal to twice the diameter of a disc having the same surface area as a mean cross section of this strand.

A "mean cross section" of a strand means the mean of the cross sections measured at regular intervals from the base of the strand to the tip of this strand.

A "lamella" means elongate strands that have a length at least equal to twice their height.

The "mean width" of a lamella means the mean of the widths measured at regular intervals from the base of the lamella to the tip of this lamella.

SUMMARY

The tire made of rubber material comprises a sidewall and a marking protruding from this sidewall. The tire comprises a texture. The texture comprises a plurality of strands protruding from the sidewall, these strands being distributed at a density at least equal to five strands per square millimetre ($mm^2$), each strand having a mean cross section of between 0.0007 $mm^2$ and 0.06 $mm^2$ and/or the said texture comprising a plurality of substantially mutually parallel lamellae protruding from the sidewall, the spacing of the lamellae being at most equal to 0.5 mm, each lamella having a mean width of between 0.03 mm and 0.3 mm. The texture protrudes from the sidewall of the tire, this texture surrounding all or part of the marking.

The texture surrounding the marking and formed by strands or lamellae affords several advantages. On the one hand, this texture allows all or some of the incident rays of light that encounter the sidewall to become "trapped". This makes it possible to give the area around the marking a darker appearance thereby improving its contrast and therefore its visibility against the rest of the sidewall. On the other hand, this special texture makes it possible to obtain a pleasant "velour" like feel to the sidewall. Moreover, the texture used has hydrophobic properties which means that it is easier for water, dust or mud around the marking to be removed. Moreover, the texture surrounding the marking has greater durability overall. Indeed, the marking protects the texture from certain types of wear, for example wear brought about by kerbing of the wheels.

In one alternative form of embodiment, the strands of the texture or, respectively, the lamellae of the texture, extend at the same height as the marking on the sidewall.

In this way, these strands or, respectively, these lamellae, extend the sidewall of the tire at the same level as the marking. The overall visual impression of the tire sidewall is thus improved.

In another alternative form of embodiment, the strands of the texture or, respectively, the lamellae of the texture, extend at a height lower than that of the marking.

The marking thus affords protection to the texture. This then improves the durability of this texture.

In another alternative form of embodiment, the strands of the texture or, respectively, the lamellae of the texture, protrude beyond the marking.

The emerging parts of the strands or, respectively, of the lamellae, of the texture have a certain flexibility because of their slenderness. When the texture experiences rubbing, these strands or, respectively, these lamellae, deform, thereby absorbing some of the force of this rubbing. In this way, the marking is protected against wear and becomes more durable. Furthermore, the fact that the strands or, respectively, the lamellae, of the texture protrude beyond the sidewall of the tire affords an overall improvement to the tactile effect of the texture.

In one preferred embodiment, part of the strands of the texture or, respectively, part of the lamellae of the texture, protrude beyond the marking and another part of these strands or, respectively, of these lamellae, are at a lower height than this marking.

This makes it possible to strike a good balance between protecting the texture and protecting the marking.

In another embodiment, the marking comprises a raised edge with respect to the rest of this marking.

The contrast between the marking and the texture is improved even further in this way, and thus the visibility of this marking on the sidewall of the tire.

In another embodiment, the texture extends from the marking over a width L of between 0.5 mm and 50 mm.

In this way, a textured zone having sufficient dimensions to create the contrast with the marking is created around the marking. This textured zone also has limited dimensions such that its manufacturing cost is also limited.

BRIEF DESCRIPTION OF THE DRAWINGS

Further features and advantages of the embodiments of the invention will become apparent from the following description, given by way of non limiting example, with reference to the attached drawings in which.

DETAILED DESCRIPTION OF SPECIFIC EMBODIMENTS

In the description which will follow, elements that are substantially identical or similar will be denoted by identical references.

Figure 1:
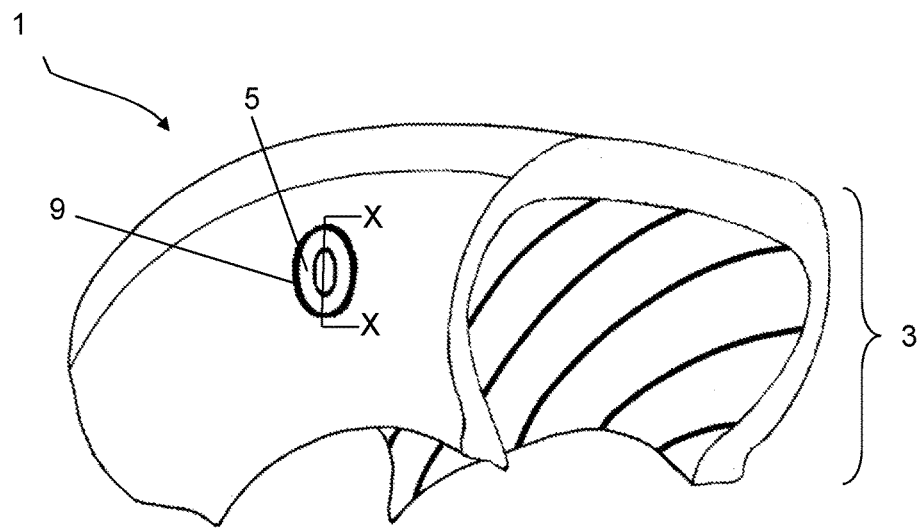
FIG. 1 is a schematic perspective view of a tire sidewall and of a marking present on this sidewall.
Figure 8:
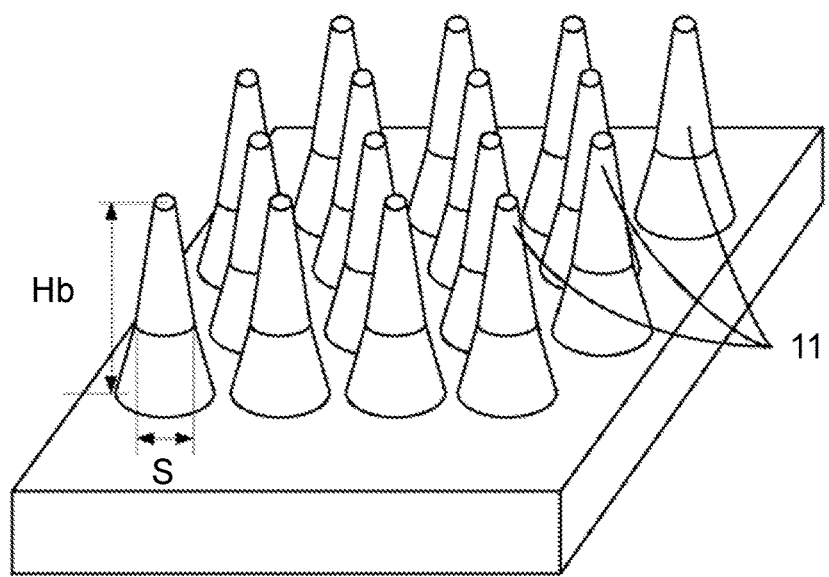
FIG. 8 is a schematic view of a texture surrounding the marking of FIG. 1 and comprising strands.

FIG. 1 depicts a sidewall 3 of a tire 1 for a passenger car, a light truck, or a heavy duty vehicle. This tire sidewall comprises a marking 5 which is O-shaped here. The tire also comprises a texture 9 disposed immediately adjacent an outer perimeter of the marking 5 and surrounding and outlining the marking 5. The texture 9 surrounds all of the marking 5 here. As shown in FIG. 1, the texture 9 is disposed immediately adjacent to the outer perimeter of the marking 5 so as to outline the marking 5. In this embodiment, the marking 5 has an inner edge and so the texture 9 is disposed immediately adjacent to the inner edge so as to outline the marking 5. As an alternative, this texture 9 surrounds only a part of this marking 5 so that in FIG. 1 the texture 9 is disposed immediately adjacent to the outer perimeter and an inner edge of the marking 5 so as to outline part of the marking 5. This texture 9 comprises a plurality of strands 11, as depicted in FIG. 8. In this figure, the strands 11 have a conical overall shape with a cross section that reduces along the height Hb of these strands. More specifically, the mean cross section of each strand, which corresponds to the mean of the cross sections S measured at regular intervals from the base of the strand upwards, is between 0.0007 mm² and 0.06 mm². In the texture 9, the strands are distributed with a density at least equal to five strands per square millimeter.

Figure 9:
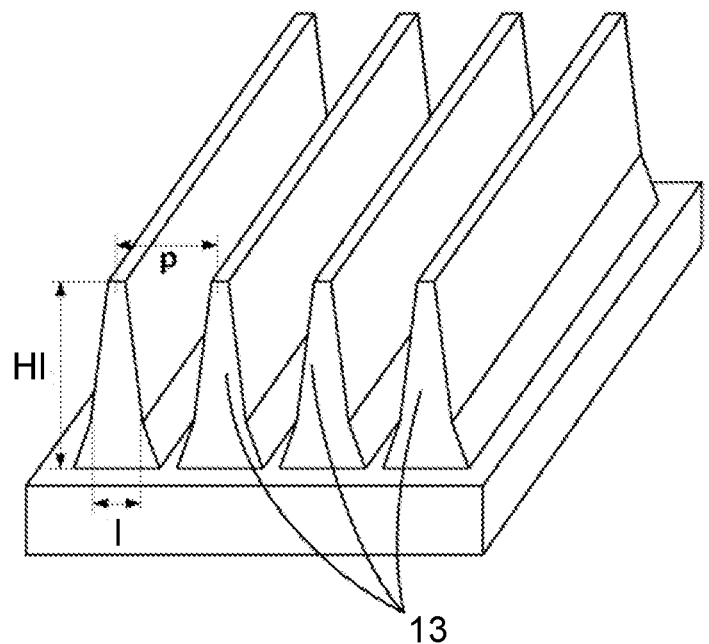
FIG. 9 is a schematic view of a texture surrounding the marking of FIG. 1 and comprising lamellae.

In an alternative form of embodiment, the texture 9 comprises a plurality of lamellae 13, as depicted in FIG. 9. In this figure, the lamellae 13 have a triangular overall cross section and the mean width of each lamella, corresponding to the mean of the width 1 measured at regular intervals along the height H1 of the lamella, is between 0.03 mm and 0.3 mm. In the texture 9, the lamellae 13 are substantially mutually parallel and the spacing P of the lamellae is at most equal to 0.5 mm.

In another alternative form of embodiment, the texture 9 comprises a combination of strands 11 and of a lamellae 13.

It will be noted here that the texture 9 extends from the marking 5 over a constant width L of between 0.5 mm and 50 mm.

Figure 2:
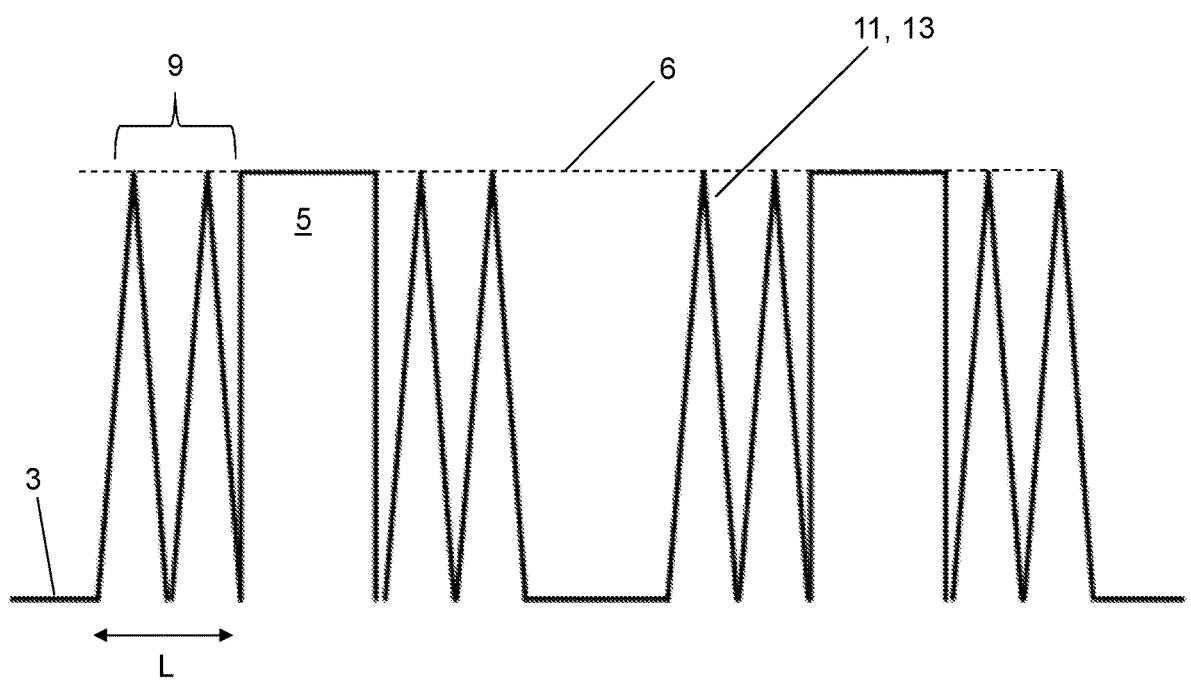
FIG. 2 is a view in section on X-X of FIG. 1, of a texture surrounding the marking present on the sidewall, according to a first embodiment of the invention.

FIG. 2 depicts a view in cross section of the texture surrounding the marking 5 according to a first embodiment of the invention. This texture may comprise strands 11 and/or lamellae 13.

More specifically, the strands 11 of the texture or, respectively, the lamellae 13 of the texture, extend at the same level as the marking 5, which means to say that the tips of these strands 11 or, respectively, the tips of these lamellae 13 are at the level 6 of the upper part of the marking 5.

Figure 3:
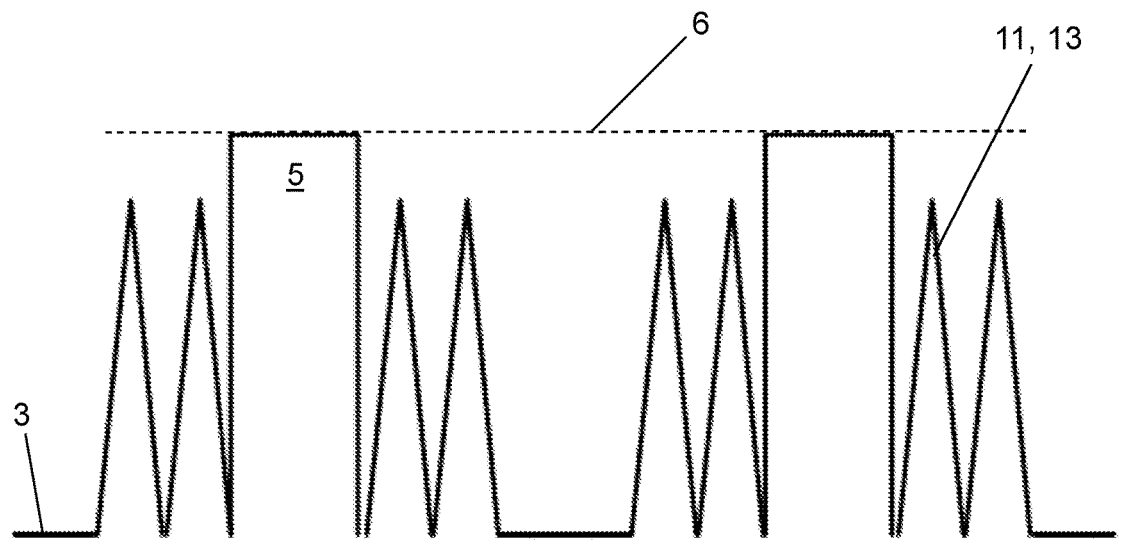
FIG. 3 is a view in section on X-X of FIG. 1, of a texture surrounding the marking present on the sidewall, according to a second embodiment of the invention.

In an alternative form of embodiment visible in FIG. 3, the strands 11 of the texture or, respectively, the lamellae 13 of the texture, extend at a height lower than that of the marking 5, which means to say that these strands 11 or these lamellae 13 are set back with respect to the level 6 of the marking.

Figure 4:
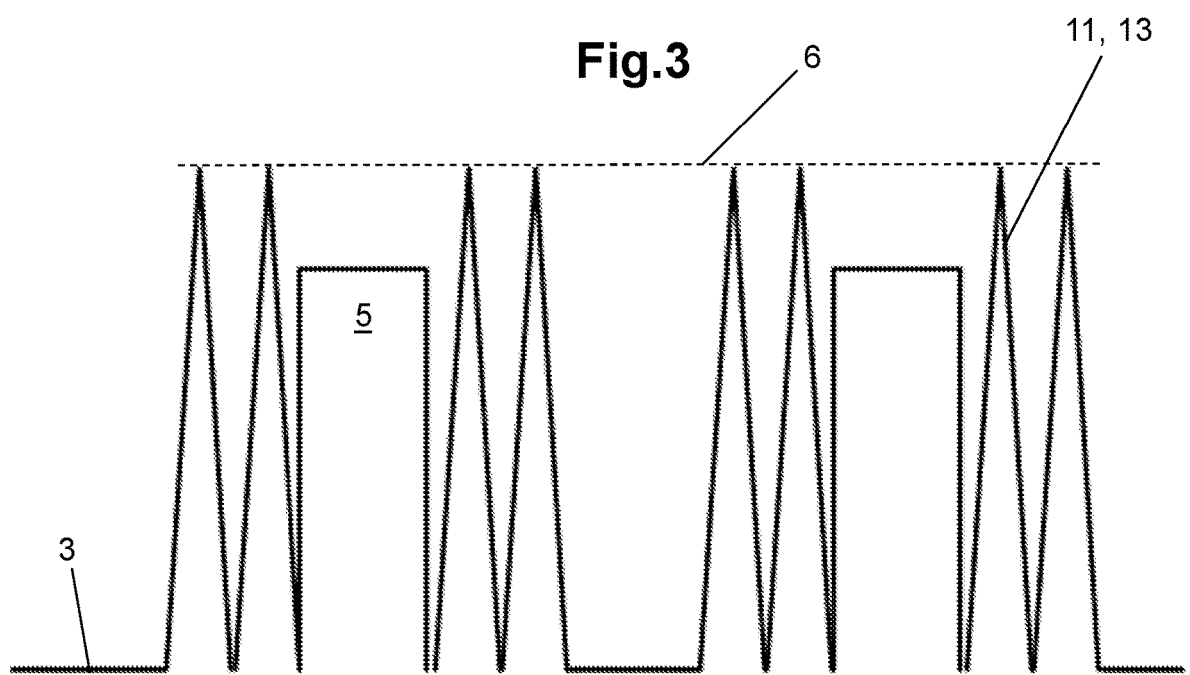
FIG. 4 is a view in section on X-X of FIG. 1, of a texture surrounding the marking present on the sidewall, according to a third embodiment of the invention.
Figure 5:
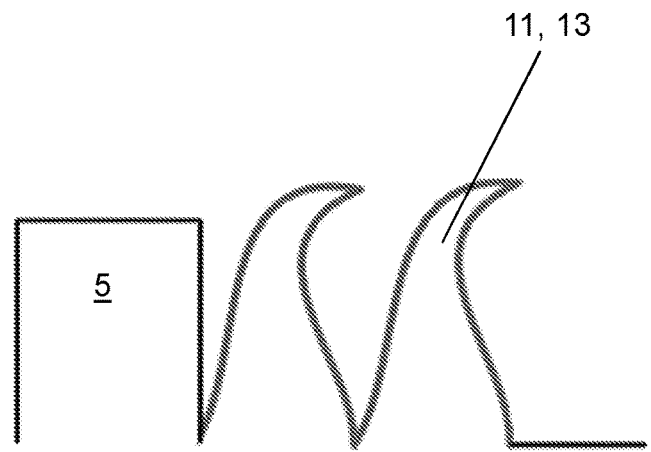
FIG. 5 depicts the condition of the texture of FIG. 4 when the sidewall is rubbed.

In another alternative form of embodiment visible in FIG. 4, the strands 11 of the texture or, respectively, the lamellae 13 of the texture, protrude beyond the marking 5, which means to say that the tips of these strands 11 or, respectively, the tips of these lamellae 13, protrude beyond the level 6 of the upper part of the marking 5. If the tire sidewall is rubbed in the region of the texture, the strands 11 or, respectively, the lamellae 13, flex, as can be seen in FIG. 5, absorbing all or some of the force of this rubbing.

Figure 6:
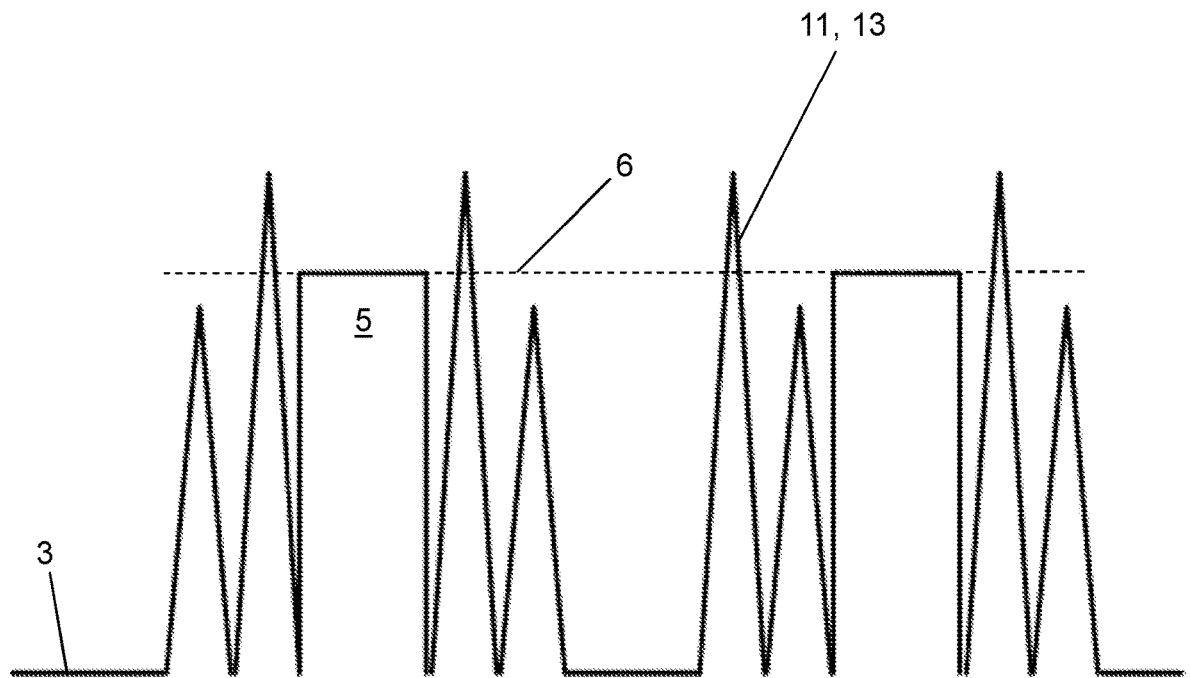
FIG. 6 is a view in section on X-X of FIG. 1, of a texture surrounding the marking present on the sidewall according to a fourth embodiment of the invention.

In another alternative form of embodiment visible in FIG. 6, part of the strands 11 of the texture or, respectively, part of the lamellae 13 of the texture, protrude beyond the marking 5 and another part of these strands 11 or, respectively, of these lamellae 13, are set back in relation to this marking 5. For preference, at least 20% of the strands 11 or, respectively, of the lamellae 13, protrude beyond the marking 5.

Figure 7:
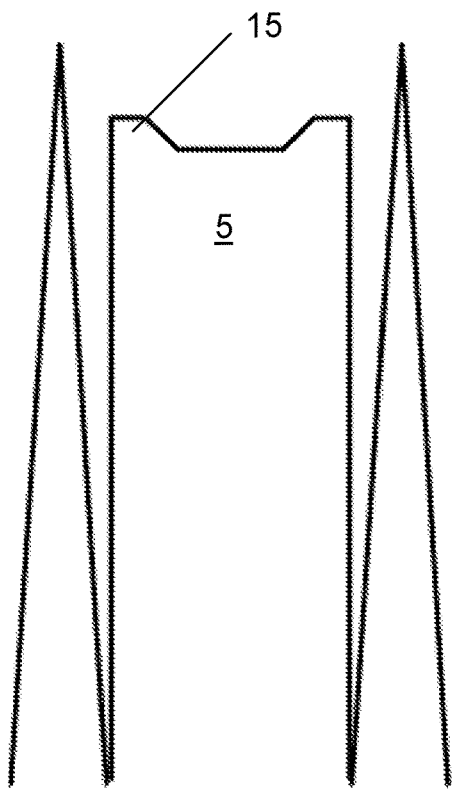
FIG. 7 depicts the marking of FIG. 1 according to a particular embodiment.

In an alternative form of embodiment visible in FIG. 7, the marking 5 comprises a raised edge 15 with respect to the rest of this marking.

The embodiments of the invention are not restricted to the examples described and depicted and various modifications can be made thereto without departing from its scope.

The tire sidewall may, for example, comprise other markings which do not have around them a texture as described in the embodiments of the invention.

Moreover, for certain markings, the texture may only surround them partially.

In addition, FIGS. 2 to 7 depict markings having a zero relief angle, which means to say great verticality. As an alternative, it is possible to produce markings having a gradient in which the relief angle is between 5 and 20°.

Finally, the lamellae 13 of FIG. 9 may be discontinuous. They may further have differences in cross section from one another.

The invention claimed is:
1. A tire made of rubber material comprising
a sidewall and a marking, this marking protruding from this sidewall and having an outer perimeter and an inner edge, this tire further comprising a texture protruding from the sidewall of the tire, the texture having a plurality of strands protruding from the sidewall, the strands being distributed at a density at least equal to five strands per square millimeter (mm$^2$), each strand having a mean cross section between 0.0007 mm$^2$ and 0.06 mm$^2$ and/or the texture having a plurality of mutually parallel lamellae protruding from the sidewall, the spacing of the lamellae being less than or equal to 0.5 mm, each lamella having a mean width between 0.03 mm and 0.3 mm, wherein the texture is disposed immediately adjacent the outer perimeter of the marking and the inner edge of the marking and outlines all or part of the marking, and wherein the texture extends from the marking over a width L that is constant around the outer perimeter of the marking and around the inner edge of the marking, the width L being at least 0.5 mm and being less than 50 mm.

2. The tire according to claim 1, wherein the strands and the lamellae of the texture extend at a same height as the marking on the sidewall.

3. The tire according to claim 1, wherein each strand and lamella of the texture extends at a height lower than that of the marking.

4. The tire according to claim 1, wherein the strands and the lamellae of the texture protrude beyond the marking.

5. The tire according to claim 1, wherein part of the strands and part of the lamellae of the texture protrude beyond the marking and another part of the strands and another part of the lamellae are at a lower height than the marking.

6. The tire according to claim 1, wherein each edge of the marking is raised with respect to the rest of this marking.

7. The tire according to claim 1, wherein the texture surrounds only part of the marking.

8. The tire according to claim 1, wherein said tire is a heavy duty tire.

* * * * *